US006937407B1

(12) United States Patent  (10) Patent No.: US 6,937,407 B1
Chen  (45) Date of Patent: Aug. 30, 2005

(54) TRANSMISSION DEVICE FOR A TWO DIMENSIONAL IMAGE DISPLAY MODULE TO DISPLAY AN IMAGE IN THE MODULE

(76) Inventor: Chris Chen, 2396 Scenic Ridge Dr., Chino Hills, CA (US) 91709

(*) Notice: Subject to any disclaimer, the term of this patent is extended or adjusted under 35 U.S.C. 154(b) by 0 days.

(21) Appl. No.: 10/825,122

(22) Filed: Apr. 16, 2004

(51) Int. Cl.[7] .............................................. G02B 7/02
(52) U.S. Cl. ..................................... 359/822; 359/813
(58) Field of Search ............................... 359/802, 804, 359/806, 807, 809, 813–814, 821, 822

(56) References Cited

U.S. PATENT DOCUMENTS

| 4,077,722 | A | * | 3/1978 | Bicskei ........................ 356/127 |
| 4,906,082 | A | * | 3/1990 | Gold ........................... 359/742 |
| 5,450,175 | A | * | 9/1995 | Sato et al. ..................... 399/201 |
| 5,737,135 | A | * | 4/1998 | Chan ........................... 359/822 |

* cited by examiner

Primary Examiner—Ricky L. Mack
(74) Attorney, Agent, or Firm—Troxell Law Office, PLL

(57) ABSTRACT

A transmission device for a 2D image display module includes rods in the box, a transmission element slidably mounted around the rods, a motor in the box and having a disk rotatably connected to a motor shaft, a driving rod eccentrically formed on top of the disk and a driving board provided with a slot defined to receive therein the driving rod, wherein distal ends of the transmission element are securely connected to the driving board, and a securing member securely connected to the transmission element to be adapted to connect to either the backboard or the lens. Rotation of the driving rod is able to drive the driving board to move, which drives the lens to move opposite to the driving board so that the image is revealed as a result of relative movement between the backboard and the lens.

11 Claims, 9 Drawing Sheets

TRANSMISSION DEVICE FOR A TWO DIMENSIONAL IMAGE DISPLAY MODULE TO DISPLAY AN IMAGE IN THE MODULE

BACKGROUND OF THE INVENTION

1. Field of the Invention

The present invention relates to a transmission device, and more particularly to a transmission device for a two dimensional (2D) image display module to display an image in the 2D image display module.

2. Description of Related Art

With reference to FIGS. 8 and 9, a conventional two dimensional (2D) image display module has a pattern (20) movably sandwiched between a backboard (10) and a lens (30). A transmission device (40) having a cam (41) rotatably mounted on the backboard plate (30) and two arms (42) pivotally connected to the lens (30). Distal ends of each of the two arms (42) are connected to the cam (41) such that when the cam (41) is rotated, the two arms (42) are able to pivot relative to the lens (30). Because the other distal ends of the two arms (42) are engaged with the pattern (20), when the two arms (42) are pivoted, the pattern (20) is moved upward and downward repeatedly. The pattern (20) is thus able to present different pictures backboardd on the angle selected via the lens (30).

It is noted from the conventional transmission device (40) that after the two arms (42) are pivoted, the pattern (20) falls back to its original position by gravity. When the humidity in the air becomes dense, the movement of the pattern (20) becomes sluggish and sometimes may not maintain in its original space, which results in that the observer can not have a very clear image in that the image presenting angle between the pattern (20) and the lens (30) is mis-aligned.

Still further, after the pattern (20) is first inserted between the lens (30) and the backboard (10), calibration of the image presenting angle between the pattern (20) and the lens (30) has to be done manually. That is, the operator has to move around the pattern (20) with the lens (30) fixed or the lens (30) with the pattern (20) moved so as to have the best image presenting angle, which is quite troublesome and inefficient.

To overcome the shortcomings, the present invention intends to provide an improved transmission device to mitigate or obviate the aforementioned problems.

SUMMARY OF THE INVENTION

The primary objective of the invention is to provide an improved transmission device for a 2D image display module. The transmission device is securely mounted on a backboard to drive either the backboard or the lens of the 2D image display module to move in a desired direction such that the image is able to be presented in a desired manner.

To accomplish the foregoing objective, the transmission device of the present invention includes multiple rods arranged along a contour of the box of the module, a step motor securely mounted on the center of the box, a transmission element securely connected to the step motor and slidably engaged with the rods and at least one securing member securely mounted on the transmission element for engagement with either the backboard of the lens of the 2D image display module. Therefore, when the step motor is activated, the transmission element is driven to slide on each of the rods thereby the backboard or the lens securely connected to the securing member which is securely mounted on the transmission element will be driven to move in a desired direction.

Other objects, advantages and novel features of the invention will become more apparent from the following detailed description when taken in conjunction with the accompanying drawings.

DETAILED DESCRIPTION OF PREFERRED EMBODIMENT

Figure 1:
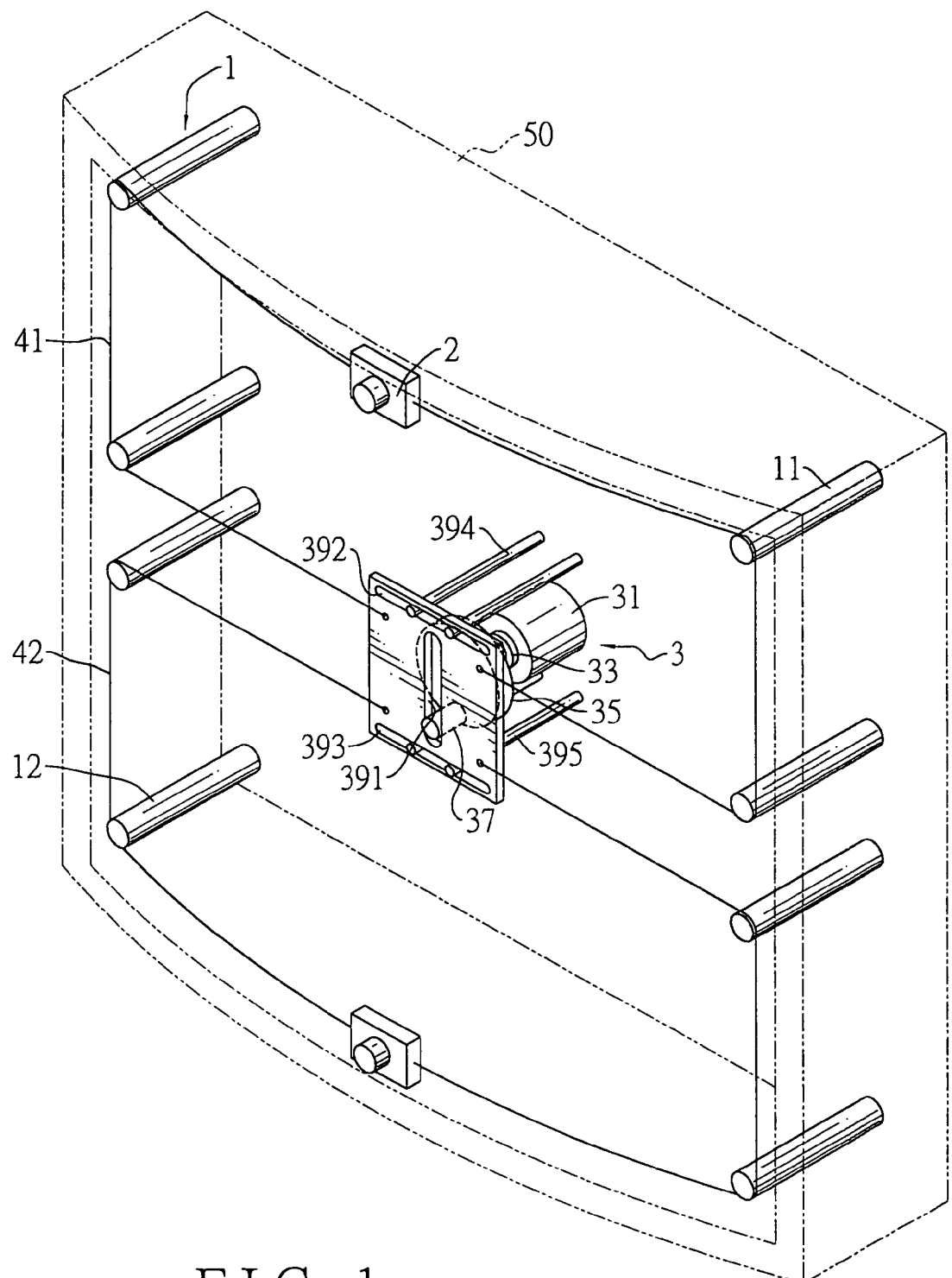
FIG. 1 is a perspective view of the transmission device of the present invention, wherein the rods are arranged in an arcuate formation.

With reference to FIG. 1, a two dimensional (2D) image display module is composed of a box (50) with a top opening, a lens (70) and a backboard (60) sandwiched between the lens (70) and a bottom face defining the top opening of the box (50). A pattern (not shown) is normally attached to a top side of the backboard (60) to face the lens (70). The transmission device in accordance with the present invention has rods (1) arranged along a contour of the box (50), at least one securing member (2) adapted to be securely connected to the backboard (60) or the lens (70) and a step motor (3) securely formed in the box (50).

Figure 2:
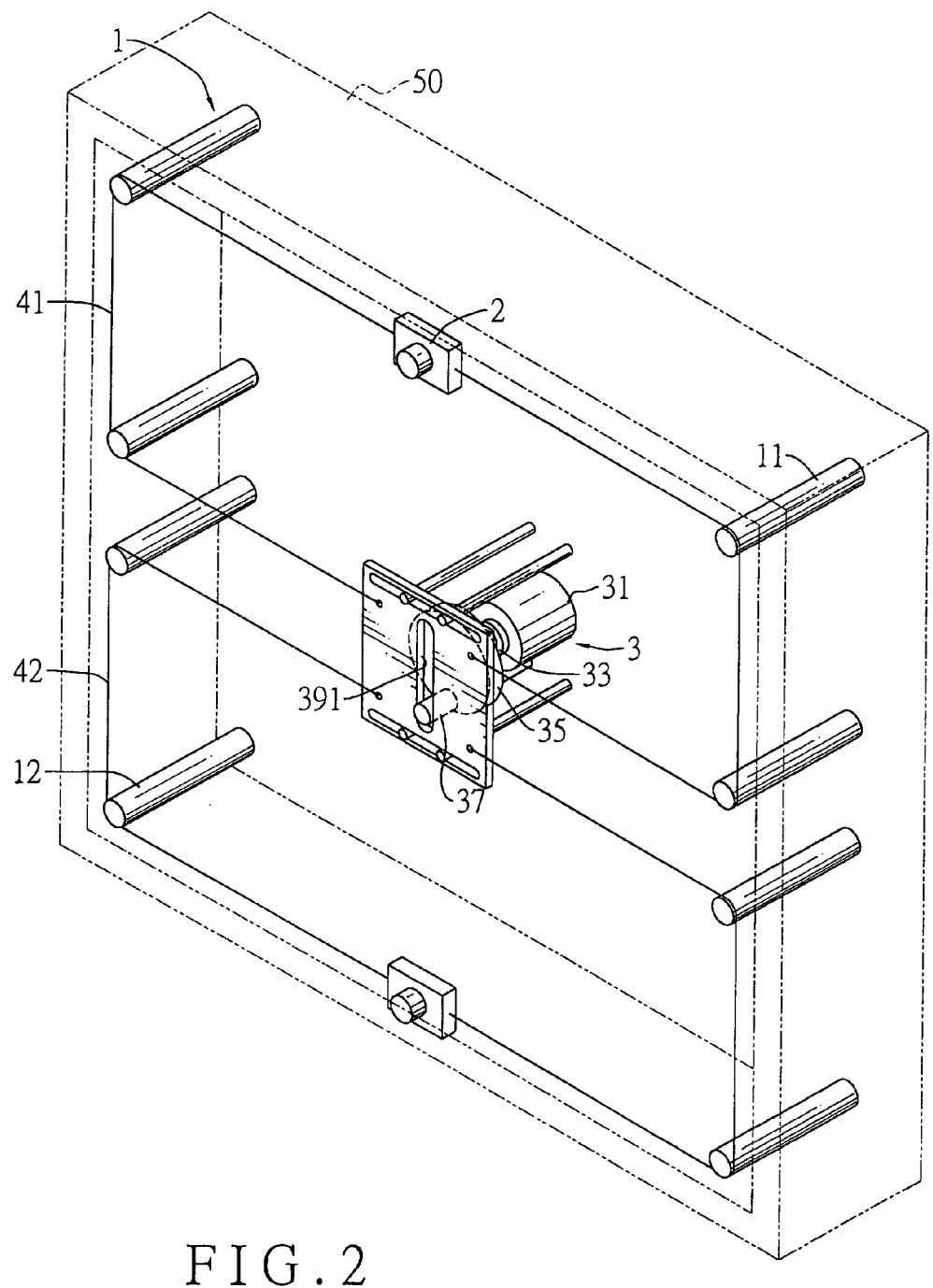
FIG. 2 is a perspective view of the transmission device of the present invention, wherein the rods are arranged in linear.
Figure 3:
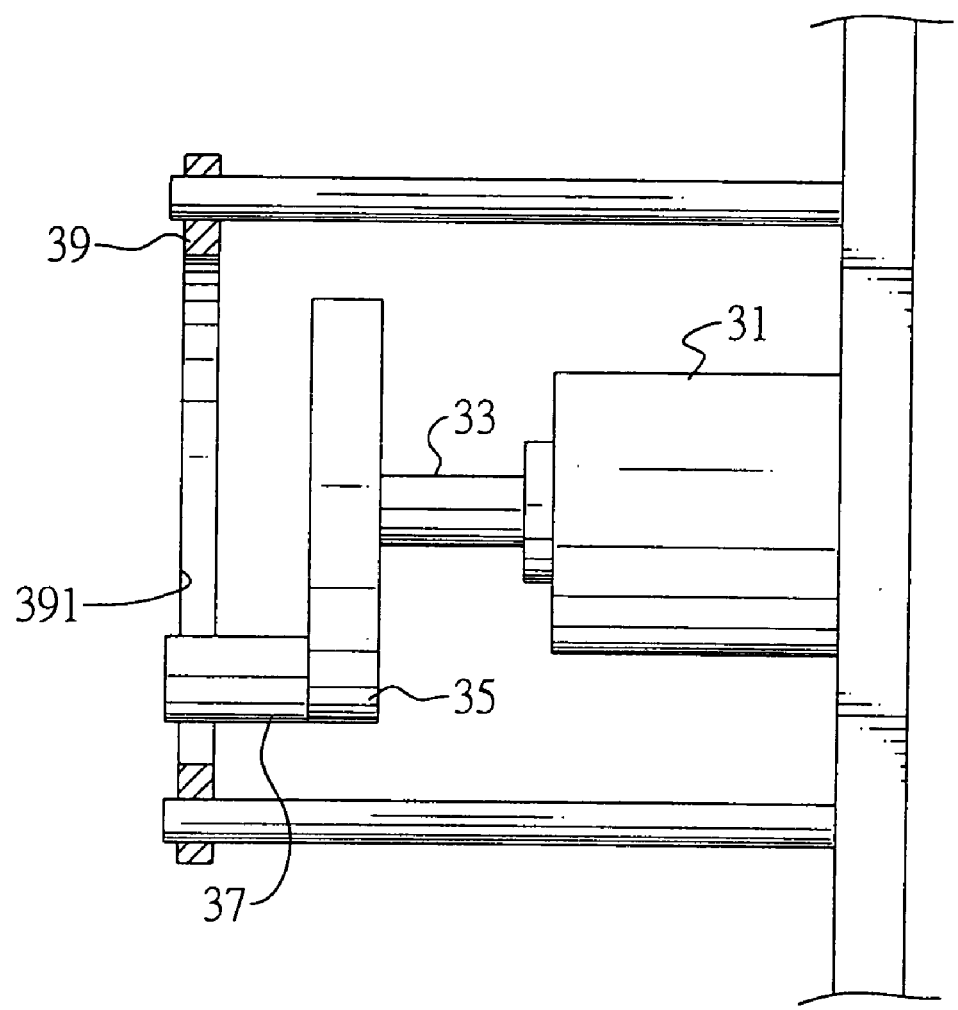
FIG. 3 is a schematic side view of the step motor and the driving board.

With reference to FIGS. 2, 3 and still taking FIG. 1 for reference, it is to be noted that the box (50) may have a contour with straight sides or a contour with arcuate sides. The rods (1) are divided into top rods (11) and bottom rods (12) by the step motor (3). A first transmission element (41) is mounted around the top rods (11) and has two distal ends securely and oppositely connected to a top portion of the step motor (3). A second transmission element (42) is mounted around the bottom rods (12) and has two distal ends securely and oppositely connected to a bottom portion of the step motor (3). The first transmission element (41) and the second transmission element (42) are respectively and slidably mounted around the top rods (11) and the bottom rods (12).

The step motor (3) includes a motor (31), a motor shaft (33) extending out of the motor (31), a disk (35) securely formed on a free end of the motor shaft (33) and a driving rod (37) eccentrically formed on top of the disk (35). A driving board (39) is provided with a slot (391) corresponding to the driving rod (37) to allow extension of the driving rod (37) to extend through the slot (391). The two distal ends of the first transmission element (41) are securely connected to the top portion of the driving board (39) and the two distal ends of the second transmission element (42) are securely connected to the bottom portion of the driving board (39).

From the foregoing drawings, it is to be noted that the driving board (39) further has a top elongated hole (392) and a bottom elongated hole (393) respectively defined in a top portion and a bottom portion of the driving board (39). Two top guiding rods (394) are formed in the box (50) and extend through the top elongated hole (392). Two bottom guiding rods (395) are also formed in the box (50) and extend through the bottom elongated hole (393).

Figure 4:
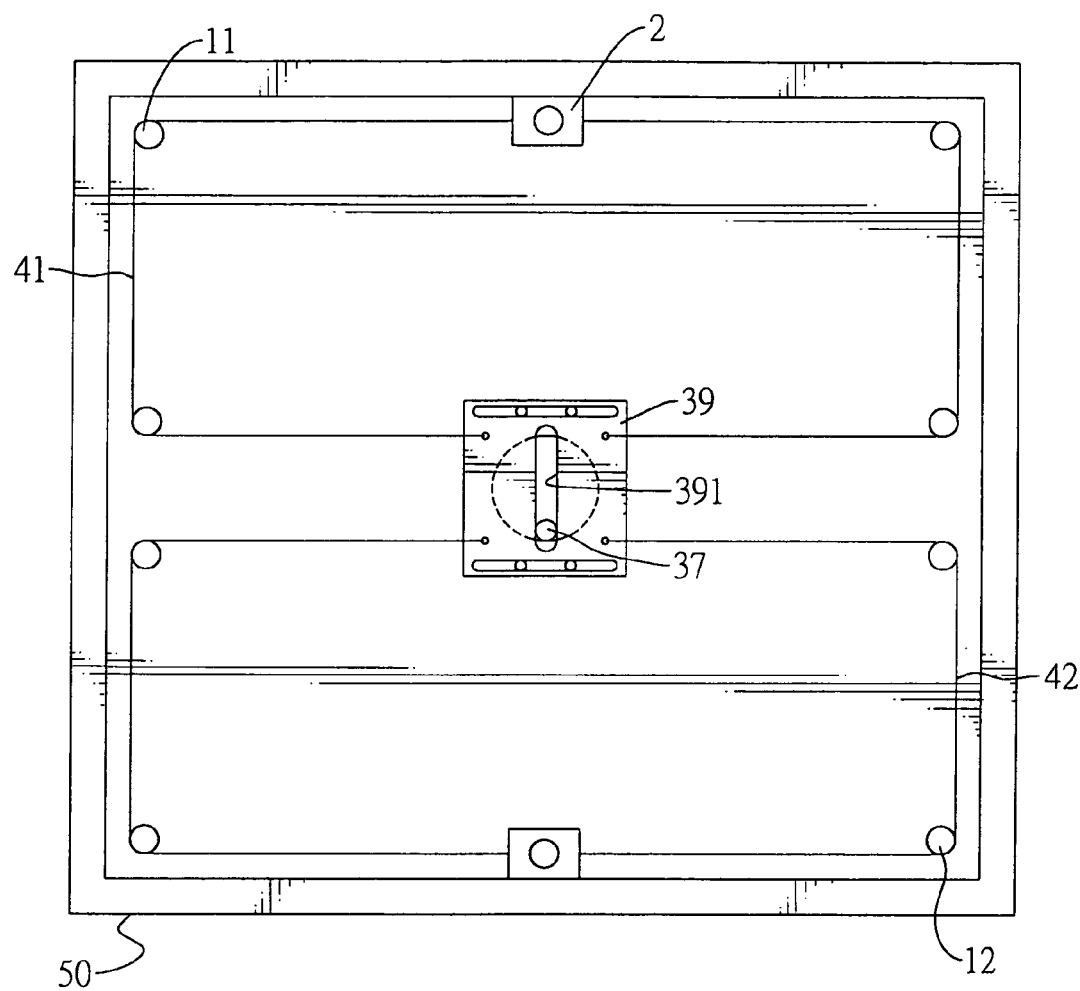
FIG. 4 is a schematic top plan view showing the transmission device of the present invention is in static status.

With reference to FIG. 4, it is noted that when the transmission device of the present invention is in static status, the driving rod (37) of the step motor (3) is received in the slot (391) of the driving board (39). The first transmission element (41) is mounted around the top rods (11) and the second transmission element (42) is mounted around the bottom rods (12). The securing member (2) is securely connected to the backboard (60) or the lens (70).

Figure 5:
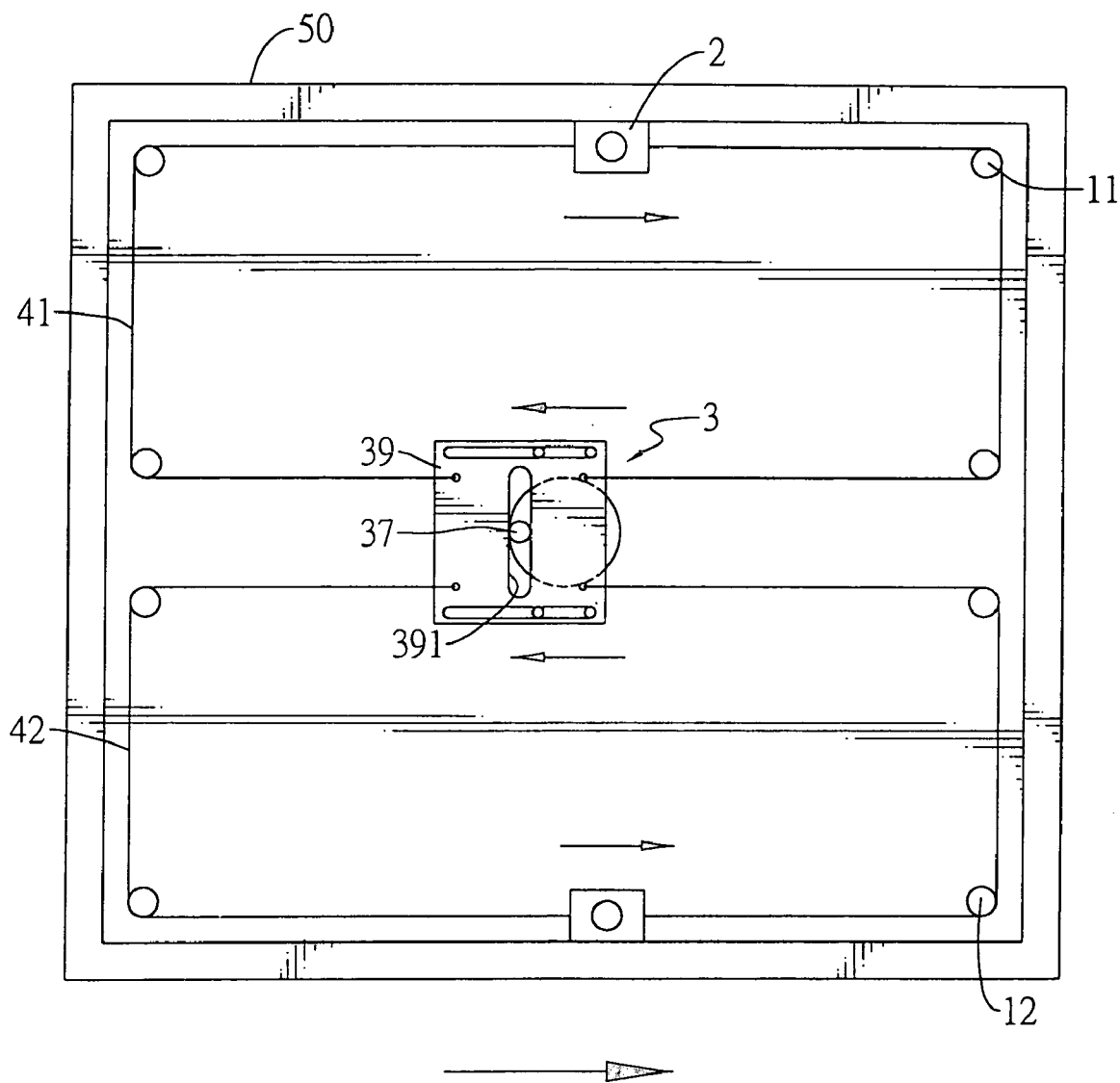
FIG. 5 is a schematic top plan view showing the clockwise rotation of the step motor drives the securing member to move to the right relative to the step motor.
Figure 6:
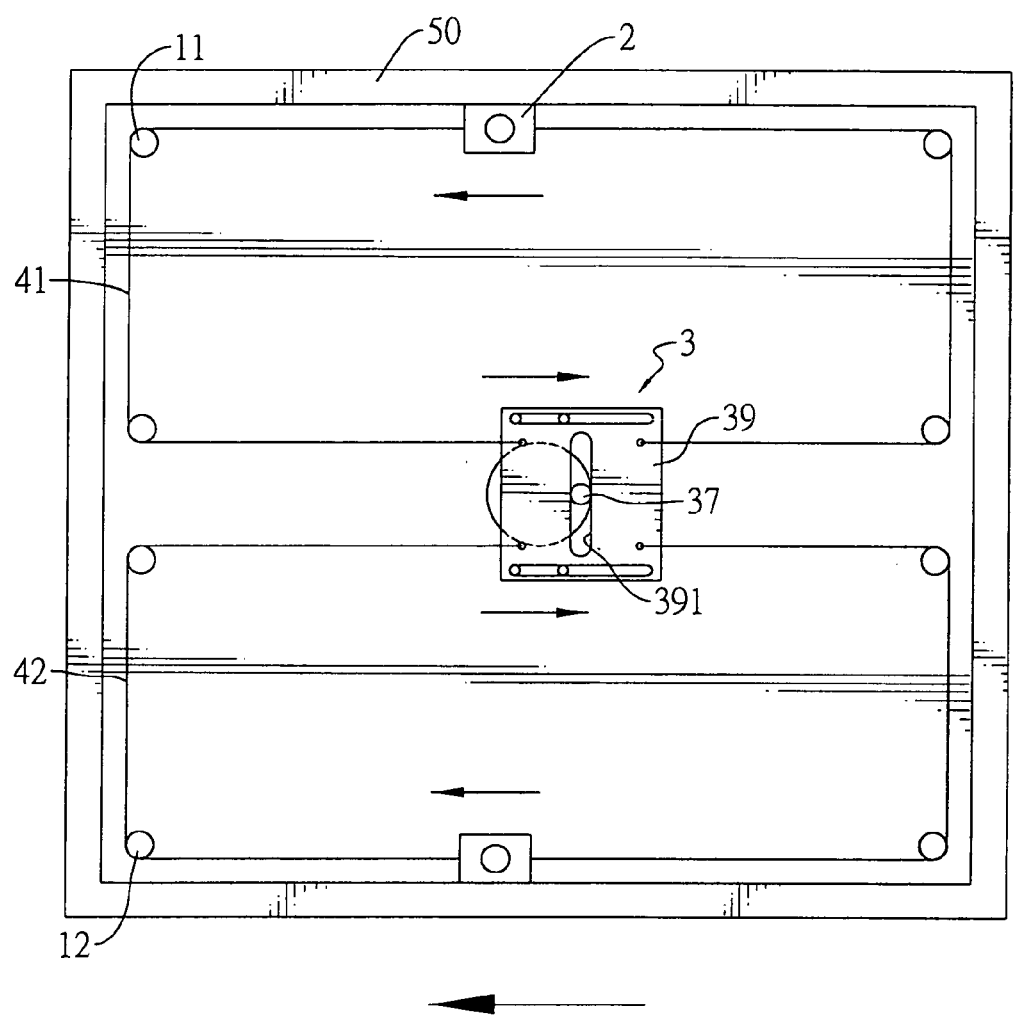
FIG. 6 is a schematic top plan view showing the counterclockwise rotation of the step motor drives the securing member to move to the left relative to the step motor.

With reference to FIGS. 5 and 6, when the motor (31) of the step motor (3) is activated, the eccentrically formed driving rod (37) on the disk (35) is rotated. The rotation of the driving rod (37) drives the driving board (39) to move either to the right or to the left (FIG. 5 indicates that the driving board is moving to the left and FIG. 6 indicates that the driving board is moving to the right). It is noted that while the driving rod (37) is rotated, due to the limitation from the slot (391) to the driving rod (37), the driving board (39) is also moved. When the driving board (39) is moving to the left relative to the box (50), the first transmission element (41) and the second transmission element (42) are moved by the driving board (39), which causes the backboard (60) or the lens (70) to move in a direction opposite to that of the driving board (39).

Therefore, when the driving board (39) is moving to the left relative to the box (50) and when the securing member (2) is securely connected to the backboard (60), the backboard (60) will be moved to the right relative to the box (50). When the driving board (30) is moving to the right relative to the box (50) and the securing member (2) is securely connected to the lens (70), the lens (70) will be moved to the left relative to the box (50).

However, when the driving board (39) is moving to the right relative to the box (50) and when the securing member (2) is securely connected to the backboard (60), the backboard (60) will be moved to the left relative to the box (50). When the driving board (30) is moving to the left relative to the box (50) and the securing member (2) is securely connected to the lens (70), the lens (70) will be moved to the right relative to the box (50).

The movement of the backboard (60) relative to the lens (70) or the movement of the lens (70) relative to the backboard (60) reveals the image sandwiched between the backboard (60) and the lens (70).

While the backboard (60) or the lens (70) is moved to reveal the image between the backboard (60) and the lens (70), the top guiding rods (394) and the bottom guiding rods (395) are respectively moved in the top elongated hole (392) and the bottom elongated hole (393) to ensure the movement of the driving board (39) smooth.

The reason why the securing member (2) can be securely connected to either the backboard (60) or the lens (70) is because the operator is able to determine according to the size of the image or the size limitation from either the backboard or the lens which element to be secured by the securing member (2) so that the image is best shown.

Figure 7:
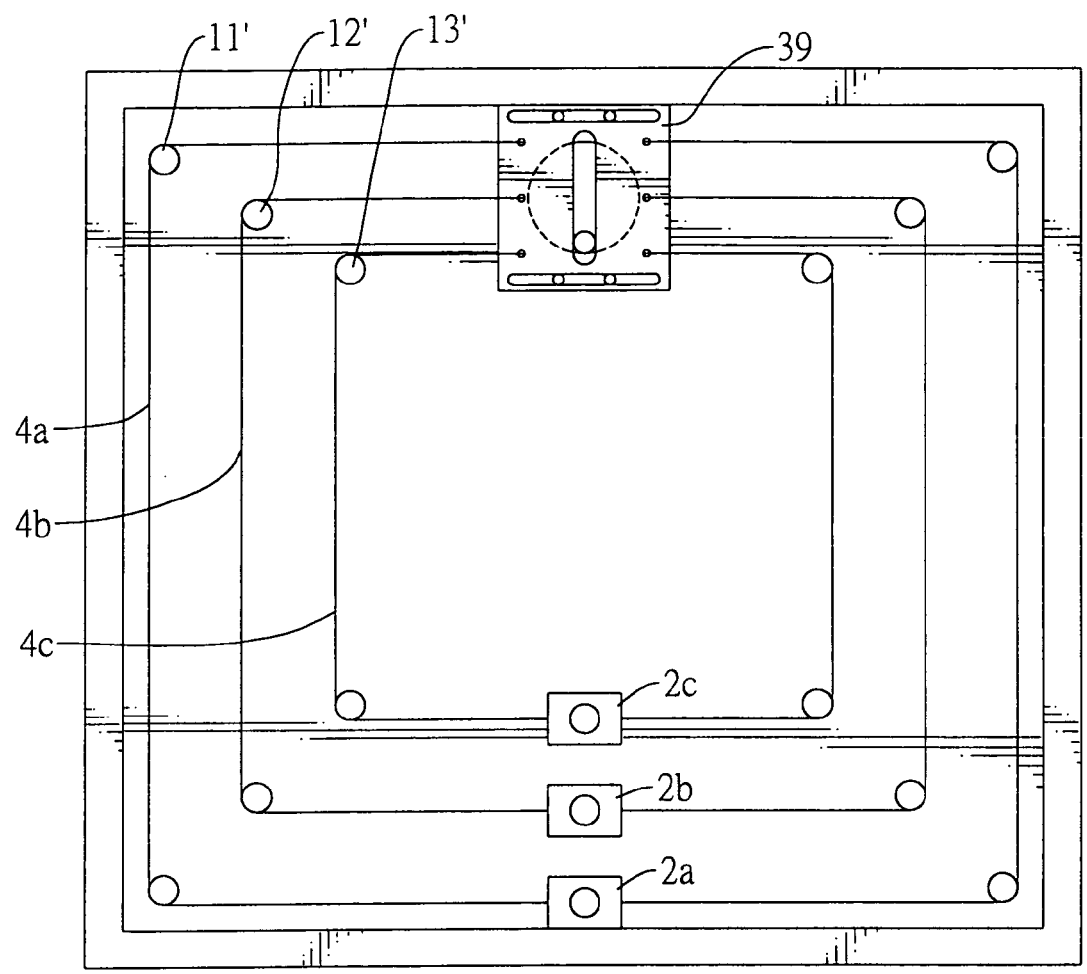
FIG. 7 is a schematic plan view showing another embodiment of the present invention.
Figure 8:
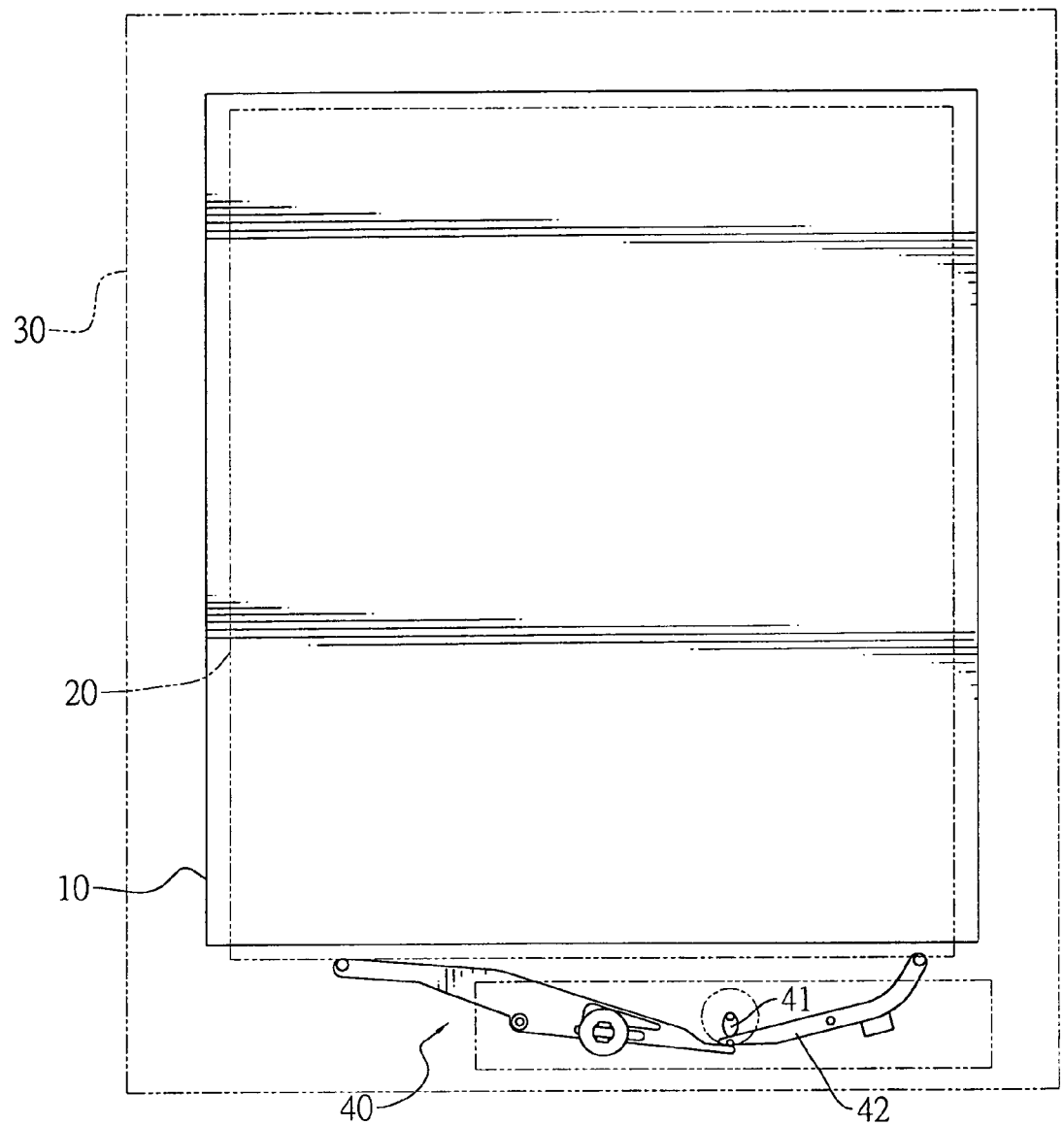
FIG. 8 is a schematic view showing a conventional transmission device used in a 2D image display module.
Figure 9:
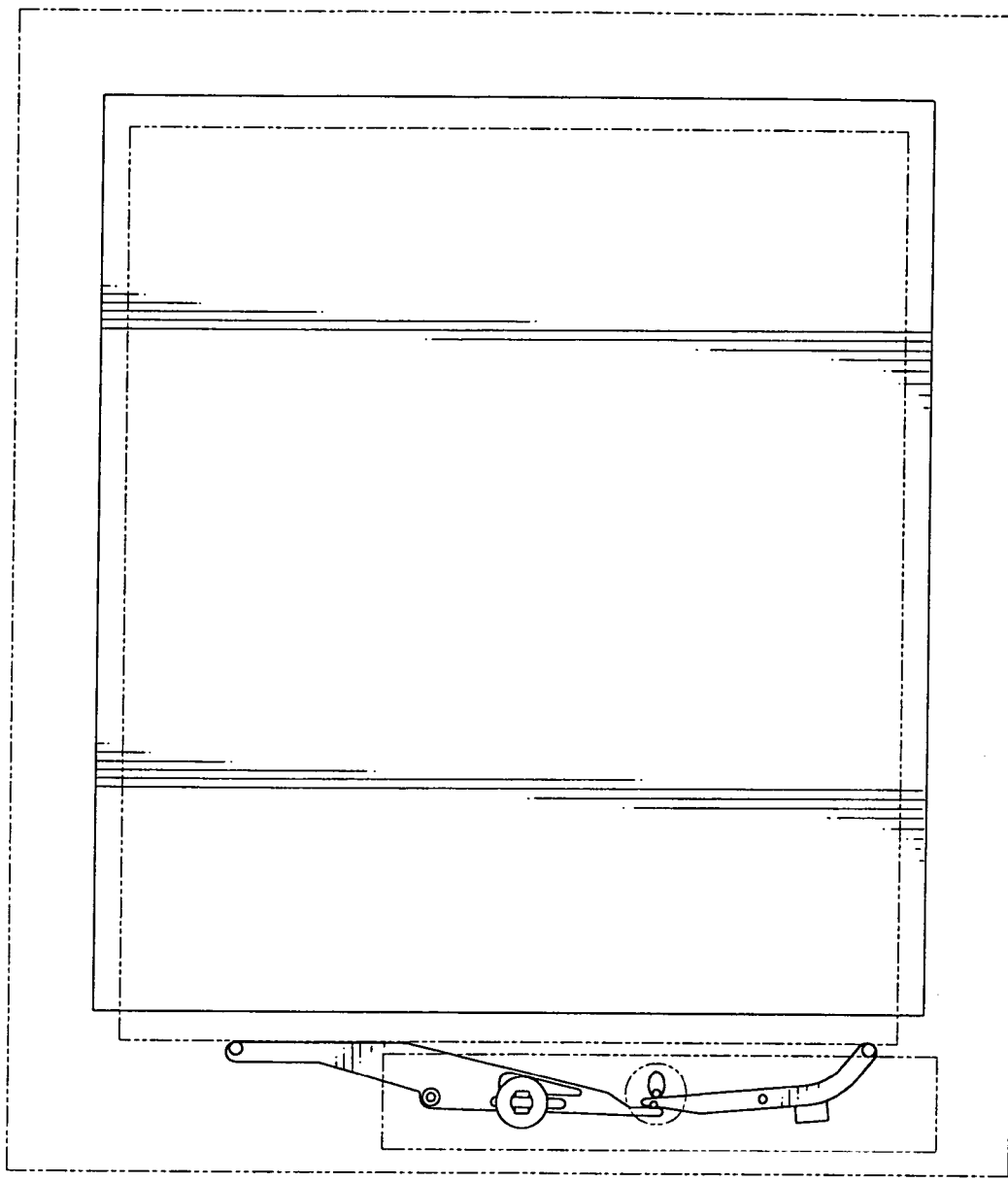
FIG. 9 is a schematic view showing that the pattern sandwiched between the lens and the backboard is adjusted via the transmission device in FIG. 8.

With reference to FIG. 7, another embodiment of the present invention is shown, wherein the rods are no longer divided into top rods (11) and bottom rods (12) but to different layers, for example, a first layer rods (11'), a second layer rods (12') and a third layer rods (13'). In order to correspond to the arrangement of the first layer rods (11'), the second layer rods (12') and the third layer rods (13'), the securing member now is divided into a first securing member (2a), a second securing member (2b) and a third securing member (2c). The transmission element is also divided into a first transmission element (4a), a second transmission element (4b) and a third transmission element (4c). Each of the first transmission element (4a), second transmission element (4b) and the third transmission element (4c) is respectively mounted around a corresponding layer of rods, i.e., everyone of the first layer rods (11'), the second layer rods (12') and the third layer rods (13'). Two distal ends of the first, second and third transmission element (4a,4b,4c) are securely connected to the driving board (39) such that when the driving board (39) is moved and when the first, second and third securing members (2a,2b,2c) are selectively and respectively connected to the backboard (60), the lens (70) or the image which is sandwiched between the backboard (60) and the lens (70), the movement of the driving board (39) will also reveal the image. That is, if the first securing member (2a) is securely connected to the lens (70) and the third securing member (2c) is securely connected to the image, the movement of the driving board (39) drives the lens (70) and the image to move in a direction opposite to that of the driving board (39), which reveals the picture on the image. The connection of the first, second and third securing member (2a,2b,2c) to the lens (70), backboard (60) and the image may have different combinations and still accomplishes the designed goal of revealing the picture. Thus, it is learned that as long as there is relative movement between the lens (70) and the backboard (60), the picture on the image is shown.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A transmission device for a two dimensional (2D) image display module having a box with a top opening, a lens received in the box, a backboard sandwiched between a bottom face defining the top opening of the box and the lens and an image sandwiched between the lens and the backboard, the transmission device comprising:
   rods adapted to be arranged along a contour of the box;
   a transmission element slidably mounted around the rods;
   a motor adapted to be securely mounted in the box and having a disk rotatably connected to a motor shaft, a driving rod eccentrically formed on top of the disk and a driving board provided with a slot defined to receive therein the driving rod, distal ends of the transmission element are securely connected to the driving board; and
   at least one securing member securely connected to the transmission element to be adapted to connect to the backboard, whereby rotation of the driving rod due to activation of the motor is able to drive the driving board to move a first direction, which drives the backboard to move via the transmission element and the securing member in a second direction opposite to the first direction so that the image is revealed as a result of relative movement between the backboard and the lens.

2. The transmission device as claimed in claim 1, wherein the transmission element is divided into a first transmission element having two distal ends securely connected to opposite sides on a top portion of the driving board and a second transmission element having two distal ends securely connected to opposite sides of a bottom portion of the driving board.

3. The transmission device as claimed in claim 2, wherein the rods are divided into top rods having the first transmission mounted therearound and bottom rods having the second transmission element mounted therearound.

4. The transmission device as claimed in claim 3, wherein the driving board has a top elongated hole and a bottom elongated hole respectively defined in a top portion and a bottom portion of the driving board, two top guiding rods are adapted to be formed in the box and extend through the top elongated hole and two bottom guiding rods are adapted to be formed in the box and extend through the bottom elongated hole to ensure smooth movement of the driving board.

5. A transmission device for a two dimensional (2D) image display module having a box with a top opening, a lens received in the box, a backboard sandwiched between a bottom face defining the top opening of the box and the lens and an image sandwiched between the lens and the backboard, the transmission device comprising:
   rods adapted to be arranged along a contour of the box;
   a transmission element slidably mounted around the rods;
   a motor adapted to be securely mounted in the box and having a disk rotatably connected to a motor shaft, a driving rod eccentrically formed on top of the disk and a driving board provided with a slot defined to receive therein the driving rod, distal ends of the transmission element are securely connected to the driving board; and
   at least one securing member securely connected to the transmission element to be adapted to connect to the lens,
   whereby rotation of the driving rod due to activation of the motor is able to drive the driving board to move a first direction, which drives the lens to move via the transmission element and the securing member in a second direction opposite to the first direction so that the image is revealed as a result of relative movement between the backboard and the lens.

6. The transmission device as claimed in claim 5, wherein the transmission element is divided into a first transmission element having two distal ends securely connected to opposite sides on a top portion of the driving board and a second transmission element having two distal ends securely connected to opposite sides of a bottom portion of the driving board.

7. The transmission device as claimed in claim 6, wherein the rods are divided into top rods having the first transmission element mounted therearound and bottom rods having the second transmission element mounted therearound.

8. The transmission device as claimed in claim 7, wherein the driving board has the a top elongated hole and a bottom elongated hole respectively defined in a top portion and a bottom portion of the driving board, two top guiding rods are adapted to be formed in the box and extend through the top elongated hole and two bottom guiding rods are adapted to be formed in the box and extend through the bottom elongated hole to ensure smooth movement of the driving board.

9. A transmission device for a two dimensional (2D) image display module having a box with a top opening, a lens received in the box, a backboard sandwiched between a bottom face defining the top opening of the box and the lens and an image sandwiched between the lens and the backboard, the transmission device comprising:
   rods adapted to be arranged along a contour of the box;
   transmission elements slidably mounted around the rods;
   a motor adapted to be securely mounted in the box and having a disk rotatably connected to a motor shaft, a driving rod eccentrically formed on top of the disk and a driving board provided with a slot defined to receive therein the driving rod, distal ends of the transmission element are securely connected to the driving board; and
   securing members securely connected to the transmission element to be adapted to connect to the lens or the backboard,
   whereby rotation of the driving rod due to activation of the motor is able to drive the driving board to move in a first direction, which drives the lens to move via the transmission element and the securing member in a second direction opposite to the first direction so that the image is revealed as a result of relative movement between the backboard and the lens.

10. The transmission device as claimed in claim 9, wherein the rods are divided to a first layer rods, a second layer rods and a third layer rods each having two distal ends securely connected to the driving board, the transmission element is divided into a first transmission element slidably mounted around the first layer rods, a second transmission element slidably mounted around the second layer rods and a third transmission element slidably mounted around the third layer rods.

11. The transmission device as claimed in claim 10, wherein the securing members are divided to first, second and third securing members respectively mounted on the first transmission element, second transmission element and third transmission element for securing the lens or the backboard.

* * * * *